(12) United States Patent
Atluri et al.

(10) Patent No.: US 8,612,075 B2
(45) Date of Patent: Dec. 17, 2013

(54) OPTIMIZING USE OF SOLAR PHOTOVOLTAIC-GENERATED ELECTRICITY IN ELECTRIC OR HYBRID VEHICLES

(75) Inventors: Venkata Prasad Atluri, Ann Arbor, MI (US); Thomas L. Gibson, Washington Township, MI (US); Nelson A. Kelly, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 359 days.

(21) Appl. No.: 12/793,752

(22) Filed: Jun. 4, 2010

(65) Prior Publication Data

US 2011/0301790 A1 Dec. 8, 2011

(51) Int. Cl.
G06F 19/00 (2011.01)
(52) U.S. Cl.
USPC ........................................ 701/22; 180/65.265
(58) Field of Classification Search
USPC ........................................ 701/22; 180/65.265
See application file for complete search history.

(56) References Cited

U.S. PATENT DOCUMENTS

| 2009/0143929 A1* | 6/2009 | Eberhard et al. ................. 701/22 |
| 2009/0218983 A1 | 9/2009 | Loudot |
| 2010/0213887 A1* | 8/2010 | Louch et al. .................. 320/101 |
| 2012/0133322 A1* | 5/2012 | Walsh et al. .................. 320/101 |

FOREIGN PATENT DOCUMENTS

| CN | 101292361 A | 10/2008 |
| CN | 101389505 A | 3/2009 |
| DE | 3604226 A1 | 8/1987 |
| DE | 19618882 | 11/1997 |
| DE | 19903769 A1 | 8/2000 |
| DE | 10138136 | 7/2002 |
| DE | 102006003424 A1 | 8/2007 |
| DE | 202010000551 U1 | 4/2010 |
| DE | 102009009242 A1 | 8/2010 |
| WO | 2009048715 A1 | 4/2009 |

* cited by examiner

*Primary Examiner* — James Trammell
*Assistant Examiner* — Jerrah Edwards
(74) *Attorney, Agent, or Firm* — Reising Ethington, P.C.

(57) ABSTRACT

An electric or hybrid-electric vehicle is provided with vehicle-mounted solar cells capable of generating electrical power. The power from the array is directed to vehicle systems according to a pre-determined algorithm intended to most effectively extend the vehicle range when operated under electric power. Power from the solar cells is directed by a controller, and may be applied to directly charge the batteries or to power electric power receiving devices, for example, to control cabin temperatures, depending on factors including the state of charge of the batteries, whether or not, the vehicle is parked and the current cabin temperature. The controller is also capable of controlling and managing the operating voltage of the solar cells to ensure optimal power extraction from the cells.

16 Claims, 3 Drawing Sheets

OPTIMIZING USE OF SOLAR PHOTOVOLTAIC-GENERATED ELECTRICITY IN ELECTRIC OR HYBRID VEHICLES

TECHNICAL FIELD

This invention pertains to methods of managing the operation of a solar photovoltaic device, intended for supplementary electric power generation in electric or hybrid electric vehicles, for maximum power usage of the photovoltaic power. The photovoltaic devices may be solar cells, modules or arrays, where: a solar cell is an individual semiconductor device capable of converting light energy into electrical energy; a module is a collection of cells wired in series and/or parallel; and an array is a collection of modules, wired in series or parallel.

BACKGROUND OF THE INVENTION

Electric vehicles are increasingly viewed as desirable successors to the internal combustion-engine vehicles currently used for personal and mass transportation. Such electric vehicles may be 'pure', battery-powered, electric motor driven electric vehicles with no on-board internal combustion engine, or hybrid-electric vehicles with a small on-board internal combustion engine which may be employed for battery charging. In either case, electrical power stored in a battery is delivered to a traction motor which propels the vehicle. For a given vehicle, the available range under exclusively electric power primarily depends on the capacity and capabilities of its high-voltage (traction) battery capacity. Thus every effort is made to fully utilize the battery capacity of electric or hybrid-electric vehicles subject to packaging, weight or cost constraints.

Electric vehicles intended for a mass market usually incorporate the electrical accessories and convenience features, lighting, adjustable mirrors, power windows and such found on counterpart internal combustion engine vehicles. Hence, in addition to their high-voltage battery, electric vehicles may also incorporate a low-voltage, nominally 12 volt battery, sized and adapted to operate these accessories and convenience features. In a hybrid electric vehicle, the low-voltage battery may also operate the starter for the on-board internal combustion engine.

Hence there is a need to manage electrical power usage in such vehicles to enable efficient energy usage and extend vehicle range. Further gains in range may be obtained by addition of on-vehicle means for recapturing or regenerating electrical energy, for example, regenerative braking.

Even so, the range of such electrically-powered vehicles remains less than their internal combustion-engine counterparts. There is, thus, an on-going interest in the application of yet additional approaches for extending vehicle range when operating electric or hybrid-electric vehicles under only electric power.

SUMMARY OF THE INVENTION

Electrical power derived from vehicle-mounted photovoltaic (solar) cell power sources, generally comprising a plurality of interconnected individual solar cells, is used to supplement the stored battery power of electrically-propelled vehicles. Such solar cells are most effective, that is, generate the greatest power, when mounted on any of a vehicle's horizontal surfaces. Most commonly, such cells are located on a vehicle's roof and encompass an areal extent of about one square meter. The cells may be mounted in a fixed, generally horizontal position, or may be mounted such that they may be re-oriented responsive to the location of the sun relative to the solar cell.

The output of solar cells may vary widely due to climatic variations which may be short-term, for example isolated clouds passing in front of the sun, or long-term, for example, persistent heavy overcast. It is therefore preferred that the output of such a solar cell power source be assessed frequently. This requires sensors, such as thermopiles, capable of determining the solar radiation incident on the cell. These sensors may be independent of the cell or integrated with the cell.

The output of the solar-derived electrical power is preferably directed to increase the vehicle's range. The power which may be extracted from the solar cell, even under temporarily constant climatic conditions, depends on the electrical load which it is called upon to operate. Achieving maximum output from the variable solar cell power source requires continuously matching the electrical demand to the available power from the solar cell. Hence, the overall solar cell power management strategy has two complementary aspects: directing the solar cell output to those applications which will most effectively increase vehicle range; and ensuring that the maximum available power is extracted from the solar cell. The power management strategy will be adaptive so that it may be responsive, both to variations in light intensity incident on the solar cell array and also to varying vehicle use patterns, including when parked and unoccupied.

Power management will be implemented by a computer-based controller. The controller may communicate with a plurality of sensors and incorporate sufficient computing power to interpret the sensor output and execute prescribed power management algorithms. The controller may be connected to both the solar cell array, as well as to a low-voltage battery (e.g. 12-14 volts), a high-voltage traction battery (e.g. 300 volts), and at least one low voltage power-receiving device on the vehicle. The controller may distribute the maximum power available from the solar cell array to either battery and/or to one or more power-receiving devices for extending vehicle range.

Power may be distributed in accordance with a prioritized list. The prioritized list may reflect the configuration of the solar array and the voltage capabilities of the array as informed by the objective of minimizing electrical losses. For example an array of photovoltaic cells interconnected to produce 12-14 volts will incur the least electrical loss on operating a low-voltage accessory, a greater electrical loss when charging a low-voltage battery and the greatest electrical loss when charging the high voltage, traction battery. However, power losses for an array intended to produce 300 volts or so will generally be least when charging the traction battery.

Prioritization may also depend on the operating mode of the vehicle with low-voltage accessory operation being favored when the vehicle is occupied and/or underway, and charging one or more of the batteries being favored when the vehicle is parked.

The electrical demand associated with any of various low-voltage electrical applications may be determined. Such demands may include: directly charging a low-voltage battery; operation of one or more low voltage devices; and charging the traction battery, either directly or through DC-to-DC voltage conversion. In addition, the impact of each application on extending vehicle range will be assessed. This ranking may be informed by such factors as, for example: the operating condition of the vehicle; the current vehicle cabin temperature; the current ambient environment and the state of charge of the batteries. Knowledge of these factors may be obtained by accessing, using the controller, the output of a plurality of dedicated sensors, provided the controller is endowed with some computational capability.

The control system will direct the output of the solar cell array, on a prioritized basis, to those applications deemed most effective in increasing vehicle range under specific vehicle operating conditions. These applications may include: charging the high voltage battery; charging the low-voltage battery; operating selected devices, particularly those devices directed to enhancement of operator comfort; or any combination of these. The choice of applications will be informed by knowledge of the vehicle operational state, including the accessory battery state of charge, and the traction battery state of charge. The controller will control and limit the power applied to any application to maximize the power provided by the solar cell array.

The process of assessing the solar cell output and directing the available power most effectively to enhance vehicle range will be repeated at regular intervals to ensure that the available solar power, even under changing climatic and operating conditions, is continually allocated most effectively to the various electrical loads.

DESCRIPTION OF PREFERRED EMBODIMENTS

Advances in photovoltaic (solar) cells have led to major increases in their output and have made such cells credible and practical sources of electric power. Solar cells are semiconductors and may be based on relatively simple chemistries like single crystal or amorphous silicon, or on more complex formulations like CdTe or CuInSe. Such cells are long lived and need only minimal maintenance. They may therefore be suitable for application as passive power-generating sources for vehicles. Particular benefit may be attained by application of solar electricity generation to electric or hybrid-electric vehicles where it may enable on-board generation of electricity to partially offset the reduced energy density of batteries relative to liquid-hydrocarbon based chemical fuels.

Static solar cell array systems may be positioned at a fixed orientation or incorporate devices for tracking sun position. Vehicle-mounted solar arrays may also adopt either of these strategies. Such vehicle-mounted arrays may be placed on one of the horizontal surfaces of a vehicle, the hood, trunk lid or roof, or any combination of these, a total available area of about two to three square meters. Many current implementations however are directed to using only the vehicle roof, limiting the solar cell area to about one square meter.

The maximum power output of a solar cell may be determined based on knowledge of the solar irradiance incident on the cell. The incident solar power may be independently measured using one of several types of stand-alone pyranometers such as thermopile-based or silicon photodiode-based units or the solar cell itself may be adapted to perform the sense function.

It may be preferred that such vehicle-mounted solar installations be installed as an interconnected solar cell array to produce a voltage output compatible with a 6-cell, or nominally 12 volt, low-voltage battery. In many electric or hybrid-electric vehicles such low-voltage batteries find application as power sources for (nominally) 12 volt accessories and features such as windshield wiper motors or power door locks as well as powering the starter for the internal combustion engine in a hybrid-electric vehicle. Since in some aspects the solar cell array will be required to charge these batteries and to do so over a range of temperature which could extend from −20° C. to 50° C., the voltage requirements of a solar cell system will exceed 12 volts. For example, the preferred charging voltage of a lead-acid battery over this temperature range is from 13.5 to 16.5 volts. Such considerations are generally applicable to all battery types and systems and require that a battery-charging system be capable of delivering current at higher than battery voltage. These issues and considerations are well-known to those skilled in the arts battery storage systems and hence the electrical capabilities of the solar cell array will be well-matched to at least the charging requirements of any batteries.

It may be preferred that the vehicle-mounted solar installations be used to charge a traction battery, instead of, or, in addition to the low-voltage battery. Traction batteries, or battery packs, are generally high-voltage (typically 300 volt or greater) batteries, adapted for powering the vehicle's traction motors and propelling the vehicle. Several approaches may be adopted to charge such high voltage batteries. In one aspect this may be achieved by interconnecting the solar cells in a nominally 12 volt configuration and employing a DC-DC convertor to increase the voltage for charging the traction battery. In another aspect this may be achieved by interconnecting the solar cells in a configuration suitable for generating power at voltages compatible with charging the traction battery, say about 300 volts. In this instance a step-down DC-DC convertor may then be employed to produce voltages suitable for charging the low-voltage battery. In yet a third aspect, the total number of individual solar cells may be apportioned and connected to form at least two arrays with one generating power at high-voltage traction battery-charging voltages and a second generating power at low-voltage battery-charging voltages. Any of these aspects may be implemented in practice of the invention.

Charging the traction battery while it is powering the vehicle may be achieved according to two aspects. In a first aspect a DC-to-DC convertor suitably configured and adjusted to ensure that power is transferred from the solar cells to the battery may be employed. In a second, less effective, aspect, the battery may power the vehicle in a pulsed mode, delivering power to the drive motor for only short time periods, and relying on inertia to smooth the vehicle response. Then in the time periods between pulses, when the battery is not providing motor power, the battery may connect to the solar cells and be charged.

Even with recent advances in solar cell technology the output from a solar cell array mounted on a typical automobile is limited, and even under an optimistic scenario this output may not exceed 200 to 400 watts with current devices. This is due, in part, to limitations on the area the array may occupy. As noted, most often such arrays will be mounted only on the vehicle roof and occupy about one square meter. It will however be appreciated that that advances in solar cell efficiency, coupled with any expansion of the vehicle mounting area may increase the solar electrical output. Thus descriptions of the capabilities of current vehicle-mounted solar cell installations are intended to be exemplary and not limiting and to comprehend application of the invention to higher output solar cell systems than those which may be in current use.

On-vehicle solar cell systems may not be capable of meeting the low voltage electrical needs of an electric vehicle even on sunny days which provide optimal conditions. Under less than optimal conditions, for example under overcast skies, the output of the solar cell system will be even less. Thus the power output of the solar cell must be managed to direct the solar power in a manner which makes best use of the available power. In this case 'best use' is considered to be that which is most effective in increasing the vehicle's range under electric power.

It will be appreciated that any vehicle capable of operating under electric power will contain a wide variety of power-receiving devices which might be operated using the solar cell array output. These power-receiving devices, or loads, could include a partially-discharged low-voltage battery, a partially discharged high-voltage traction battery, and accessories such as radios or power seats, or comfort features such as heaters or heating-ventilating-air-conditioning (HVAC) blower fans.

The specific solar cell array configuration may influence the efficiency with which power from the cells may be transferred to the traction and low-voltage batteries and/or powering low voltage accessories. In one embodiment, powering low voltage accessories may result in the least power loss; charging the traction battery may result in the greatest power loss; and charging the low voltage battery may result in a power loss intermediate between that of powering the low-voltage accessories and charging the traction battery. Knowledge of the relative losses associated with differing applications of the solar-generated power may inform any prioritization of solar power distribution.

When the vehicle is operating and propelled by its electrically-powered drivetrain, determining the best use of the solar-generated power is relatively straightforward. In this circumstance electrical demands are placed on the high-voltage traction battery as well as multiple electrical demands on the, nominally 12 volt, low-voltage electrical system. These may include the HVAC fan, thermoelectric heating or cooling, and resistance heating, including heaters for heated seats. Generally the best use of the available solar power will be to direct it to the high-voltage traction battery or to the low-voltage battery and use the solar power to offset the battery power drain. During all but relatively brief intervals, such as during regenerative braking for example, the electrical demand of an operating vehicle will exceed the solar cell capability, so that all available solar-generated power may be accommodated by a battery—either the low-voltage battery or the high-voltage traction battery. However, if as in the embodiment described previously, powering one or more of the low-voltage accessories enables fewer electrical losses than charging one or other of the batteries, the low-voltage accessories may be directly operated by the solar array.

The solar cells are also capable of generating power when the vehicle is parked. In this case the determination of 'best use' is more complex. A first priority will again, generally, be to charge one or both of the batteries. If the batteries are charged sequentially, the choice of which battery to charge first may be influenced by the voltage generated by the solar cells. The use of DC-to-DC power converters, despite their greater than 90% efficiency, will result in power losses. It may then be preferable to first charge the battery whose voltage best matches the output of the solar cells and only after the first battery is charged, charge the second battery. With this approach the maximum available power may be conveyed to the battery during short stops, limiting DC-to-DC conversion power losses to only longer stops when more total solar power may be available.

When parked, however, the electrical demand will be low and it may be assumed that at least the low-voltage battery may, after some period of time, become fully charged. In this circumstance it may be preferred to redirect whatever portion of the accessory solar cell output which had been charging the low-voltage battery. One strategy may be to apply all available power to the high-voltage traction battery using one of the approaches described previously.

An alternative strategy is to use the low voltage solar cell power to operate low voltage accessories or convenience features directly to offset anticipated future low voltage electrical demand. For example, on a warm sunny day, the vehicle interior may reach elevated temperatures, temperatures which an operator, on returning to the vehicle, will deem uncomfortable. Thus immediately on entering the vehicle, an operator might be expected to turn on the HVAC fan to introduce exterior air or possibly, depending on the outside air temperature to turn on both the fan and an air conditioner. If the low-voltage battery is already adequately charged and the high-voltage traction battery is also deemed adequately charged it may therefore be more effective to have the solar cell operate the HVAC fan, and possibly the air conditioner on solar power while the vehicle is parked. This would reduce the interior temperature prior to the operator's return. This, in turn, would reduce the necessity for the returning operator to aggressively cool the vehicle interior while driving, and thereby lessen future battery demands. A similar scenario would apply on a cold day when the HVAC fan and the heater might be required.

It will be appreciated that the relative power losses associated with battery charging versus low-voltage accessory operation are of less significance in this circumstance. The length of time the vehicle will be parked is unknown. Thus operation of a low-voltage accessory during the entire period the vehicle is parked, particularly if it is a lengthy period, may confer only limited benefit. In this circumstance, capturing the solar energy by charging one or both of the batteries, even when greater electrical losses result, will be more effective in extending vehicle range.

Figure 1:
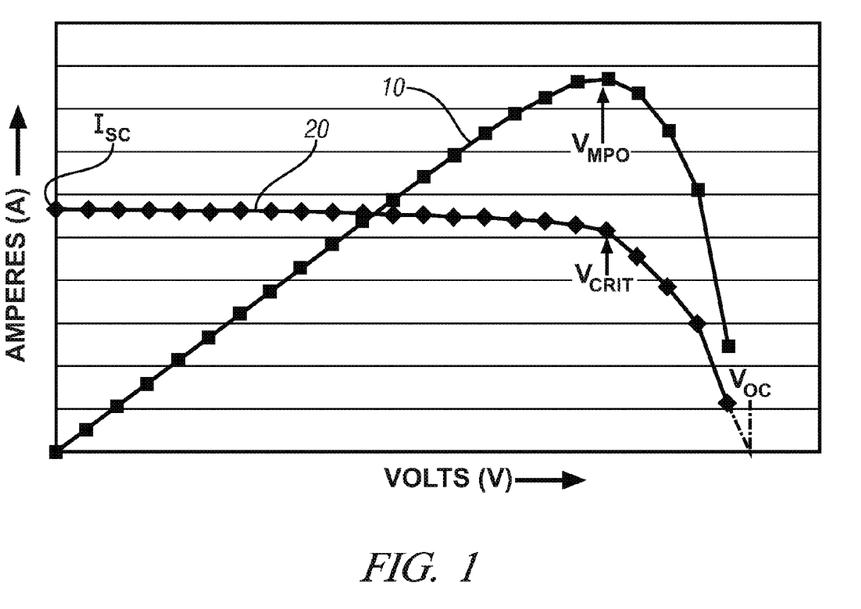
FIG. 1 is a graph schematically illustrating the variation of output current and output power of a solar cell with voltage under constant illumination. The open circuit voltage, $V_{OC}$, and short circuit current, $I_{SC}$, are shown. Also shown are voltages corresponding to the onset of fall-off in the cell current $V_{CRIT}$, and the voltage corresponding to the maximum power output of the cell, $V_{MPO}$.

Solar cells may be viewed as approximating constant current power sources. That is, up to a specified voltage, the current supplied by a solar cell is substantially constant and equal to the short circuit current, $I_{SC}$, the current when the voltage is zero up to the open circuit voltage $V_{OC}$, or the voltage under no current draw. As shown in FIG. 1, the current versus voltage curve 20 for an operating cell is reasonably well described in this way except that the current does not immediately decrease to zero at the open circuit voltage but rather rolls off, or decreases somewhat more gradually when a critical voltage $V_{CRIT}$ is attained.

Also, the short circuit current is, to good approximation, linearly proportional to the solar energy incident on the cell. Thus, one approach to determining the solar energy incident on the cell is to connect the cell across a shunt resistor and measure the current. With appropriate calibration the incident solar energy or the available solar cell power may be determined. Thermopile or external silicon photodiode sensors may also be used to determine incident solar energy but again the relationship between incident solar energy and available solar cell power requires sensor calibration.

More significantly, as also shown in FIG. 1, the curve 10 of the variation in power output of the cell with cell voltage, exhibits a maximum at a voltage $V_{MPO}$ (maximum power output) which is close to this critical voltage $V_{CRIT}$. Further inspection of power curve 10 demonstrates that operation of the cell at a voltage less than $V_{MPO}$ results in a reduction in power output generally linearly proportional to the difference between $V_{MPO}$ and the operating voltage. Operating the cell at a voltage much greater than $V_{MPO}$ dramatically reduces the available power. Obviously operation at maximum power, that is at $V_{MPO}$, is preferred, but if that is not feasible it is preferred that the solar cell be generally operated at a voltage slightly less than $V_{MPO}$.

The power delivered to a load by a solar cell or module will depend on the operating voltage of the load. For example, referring to FIG. 1, if the load has an operating voltage that is in the linear portion at a lower voltage than $V_{MPO}$, then the power supplied will be proportionately reduced as the load voltage deviates from $V_{MPO}$. The fall-off in power is even greater for load operating voltages greater than $V_{MPO}$ as shown in FIG. 1, curve 10. Thus extraction of maximum power from a solar cell or solar cell array requires power management to ensure operation of the array at $V_{MPO}$.

Figure 2:
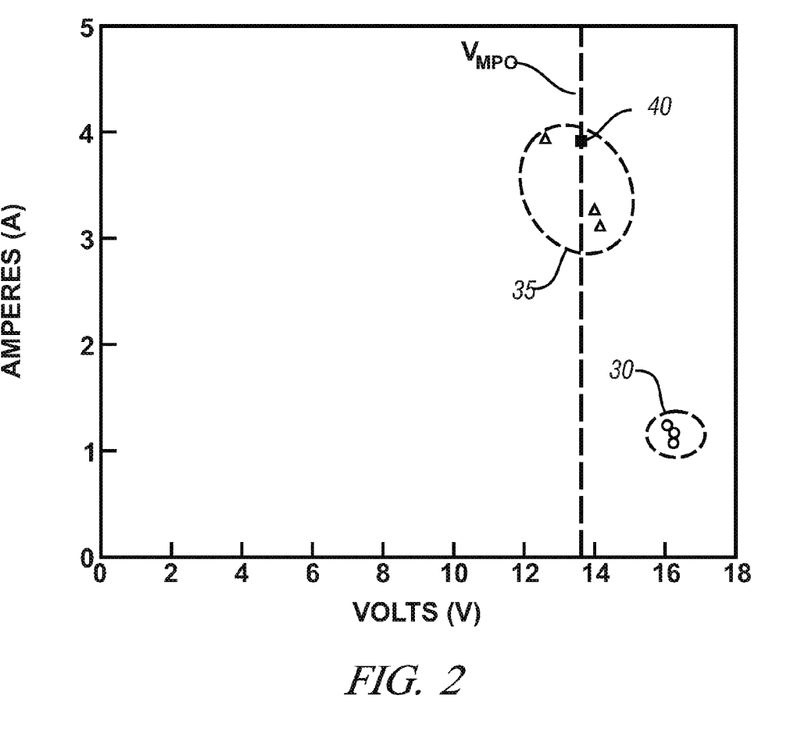
FIG. 2 shows some experimental results illustrating the beneficial effect of active management of a solar cell on optimizing extraction of available solar energy.

This behavior is shown directly in the data of FIG. 2 which compares the current extracted from a solar cell array operated at two voltages. In this circumstance, $V_{MPO}$ is about 14 volts. Operation of the array at 16 volts, a voltage greater than $V_{MPO}$, and corresponding to data grouping 30, limits the cell current output to about 1 amp and the cell power output (the product of voltage and current) to about 18 watts. The data of grouping 30 corresponds to trickle charging a battery with a solar cell irradiated with approximately 1000 watts/meter$^2$ of solar irradiance. By contrast, operating the array at a voltage generally corresponding to $V_{MPO}$, as shown at data group 35, by selectively powering additional electrical devices or loads in addition to trickle charging the battery, enables an array power output of about 44 watts. In the case of data group 35 the solar cell was exposed to about 810 watts/meter$^2$ of solar irradiance. Thus managing cell operation to occur at about $V_{MPO}$ enables extraction of appreciably more power from the cell even under a reduced incident energy flux. Also noted on FIG. 2, as data point 40 is the rated maximum power output of the cell under irradiation with 810 watts/meter$^2$ of solar irradiance, ~52 watts. It may be noted that data point 40 falls within the bounds of experimental data group 35. Thus, this value compares well with the measured output of ~44 watts obtained with the active power management enabled by appropriately controlling the cell operating voltage to about $V_{MPO}$ through selective addition of electrical loads.

Figure 3:
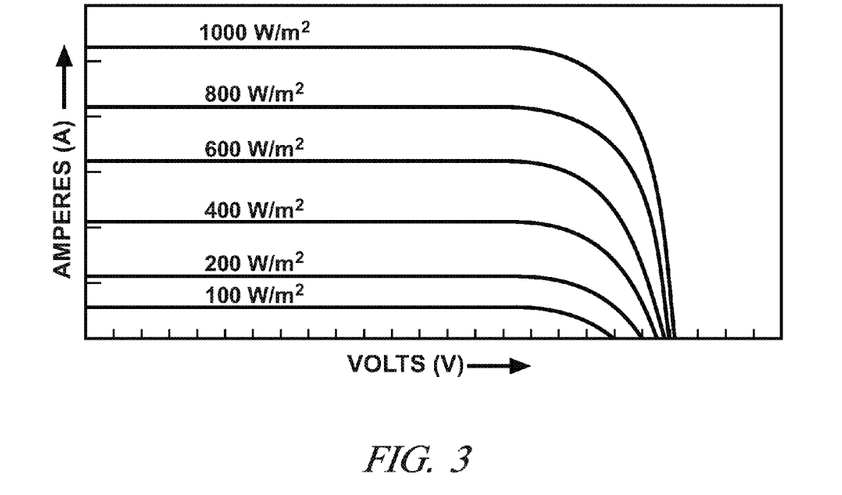
FIG. 3 is a graph schematically illustrating a family of output current—output voltage curves for a solar cell under exposure to solar irradiances ranging from 100 watts/meter$^2$ to 1000 watts/meter$^2$.
Figure 4:
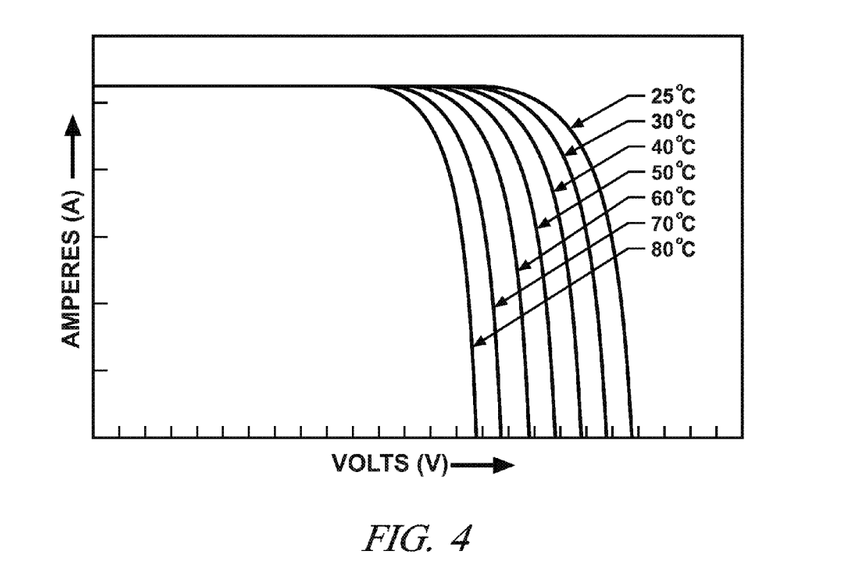
FIG. 4 is a graph which schematically illustrates a family of output current—output voltage curves for a solar cell under exposure to a solar irradiance of 1000 watts/meter$^2$ at operating temperatures ranging from 25° C. to 80° C.

The (electrical) output of solar cells is not constant but is affected by many factors. These may include, for example, the cleanliness of the solar cells, the overall solar irradiance (expressed as watts/meter$^2$, or W/m$^2$) incident on the solar cells as shown in FIG. 3 and the cell temperature (expressed as ° C.) as shown in FIG. 4. Further, solar cell power sources capable of supplying in excess of about 1 volt will consist of a plurality of interconnected individual cells. The output of such interconnected cells is further influenced the uniformity of the incident power over all the individual cells. Some of these influencing factors may change very slowly, for example cell cleanliness: other factors, such as cell temperature, may be strongly influenced by time of day and may change relatively slowly; while yet others such as the solar power incident on the cells may change rapidly as the sun is, partially or completely, temporarily obstructed by clouds, shadows etc.

Thus as demonstrated, particularly by FIG. 3, the available maximum power output of solar cells may vary widely. Under climatically changing conditions, including, for example, the passage of clouds in front of the sun, the array output may change even over time periods as short as minutes.

Because the output of the solar cells or modules will generally fall short of the total electrical demands of the vehicle it is preferred to operate the cell at its highest efficiency and extract maximum power from the solar cells or modules at all times. The variability in cell output may therefore require continually adjusting the electrical power demand on the cell to match the demand to the maximum power output of the cell. This may be achieved by means of a control device capable of both assessing the maximum cell output and connecting electrical loads to and disconnecting electrical loads from the cell in response to the assessed cell output.

In an embodiment, a controller is used to assess the output capabilities of the solar cell power source and to match the power available from the power source to the demands one or more of the electrical applications. The preferred electrical operations will be those which will make the greatest contribution to enhanced vehicle range. However the choice of operations will be informed by the need for the available solar cell power output to approximately equal the electrical demand of the operation.

By monitoring the output of the array, specifically the open circuit voltage and the short-circuit current, the output of the array may be estimated. The short circuit current is typically proportional to the incident solar power as noted previously. The open-circuit voltage is especially useful in determining $V_{MPO}$, as $V_{MPO}$ is typically linearly related to the open circuit voltage, and their ratio is similar for a wide variety of solar cells with similar chemistry (polycrystalline silicon, amorphous silicon, etc.)

This approach may require disconnecting all loads from the solar cell, at least momentarily, to make the measurements. Although the disconnection time may be brief, it is preferred that the cell output be measured frequently and frequent interruptions of the solar cell array power may be disadvantageous.

Another approach, not requiring load disconnection, is to embed within an array of solar cells one or more individual sense cells. These sense cells would be wired separately from the plurality of cells which comprise the array but they will be exposed to a substantially identical environment as the array. Hence, it may be assumed that the output of the sense cell(s) tracks with the output of the array. Thus the output of the solar array may be inferred by a simple scaling of the sense cell output based on known relative cell areas and cell interconnection practices. It will be most convenient to fabricate the sense cell(s) from a part of the solar array so that the solar energy conversion efficiencies of sense cell and solar array are identical. However, if the compositions of the sense cell and cell array differ, appropriate modification to the scaling factor may be made to accommodate this situation.

Efficient power management requires that loads be operated from or seek to draw power from solar cells only up to the available maximum power. This may be most readily accomplished if the power requirements of all on-board devices are known, enabling rapid identification by the controller of suitable combinations of devices which will draw all the available power. It is therefore preferred that the power requirements of all potential devices be stored in an electronic form and accessible by the controller, for example as a look-up table.

The power requirements of some devices commonly adopt one or more fixed values. An example of such a device may be an HVAC fan which may be operated under a number of discrete settings ("Off", "Low", "Medium" and "High" for example) or a electric seat heater which may be "On" or "Off" for example. For such devices the power requirements for each setting may stored as a fixed value, and accessed by the controller using, for example, a simple table look-up scheme.

Other loads may be variable. For example, a thermoelectric device intended to heat or cool in-coming vehicle cabin air may be operated under a variety of operating currents depending on the desired temperature differential. Similarly the battery may be charged under high or low currents. Thus, the power demands of such variable load devices cannot be incorporated in a look-up table as a single value but should be represented by a multiplicity of values for different operating scenarios, or, more preferably by an algorithm. As will become apparent these variable loads play an important role in ensuring that the solar cell array output is fully utilized.

It is preferred that even devices which currently operate under discrete settings be capable of operating in a continuously-variable manner. This capability is required to match the electrical demand to the solar cell array output. Where devices with discrete settings such as the HVAC fan or the seat heater mentioned earlier are to be operated in a continuously-variable fashion, this may be achieved by employing Pulse Width Modulation or PWM. Pulse Width Modulation is a technique which employs a series of square waves of maximum amplitude. If the square wave in 'on' for one-half the time and 'off' for one-half the time then the effect is the same as if one half of the maximum amplitude had been applied continuously. Similar considerations apply for any other ratio of 'on' and 'off' times. Thus, provided the frequency of the pulses is high enough to substantially eliminate any 'jerkiness', even a motor, such as the HVAC motor, operated under PWM control offers a continuous speed and power consumption response. In practice of this invention it is intended that all operating devices be operated under conditions which enable continuous variation in the device power demand. Thermoelectric devices and resistance heaters are inherently capable of operating in this manner and the HVAC fan motor operated under PWM likewise exhibits continuous power demand characteristics. Thus the primary loads to be operated using power from the solar cell array may all be operated under conditions which enable adjustment of the electrical demand to match the maximum power available from the array.

To best maximize vehicle range the controller must sense selected vehicle and environmental parameters. These could include the state of charge (SOC) of the batteries; the current electrical demands on the battery; the vehicle interior temperature; the vehicle exterior temperature; and whether or not the vehicle is parked, among other factors.

The controller would be pre-programmed to rank or prioritize the benefits of connecting the vehicle devices to the solar cell array power. It is generally preferred that if the batteries are less than fully charged that a first priority be to connect the solar cell array power to the battery, although other factors, for example consideration of electrical power losses may prompt an alternate prioritization. It will be appreciated that in general, particularly when primarily operated for short trips which do not require supplementing available battery power with power generated by a back-up IC engine, at least the traction battery will be depleted of charge. Thus under many operating scenarios the solar power will be applied, in total, to charging the batteries.

However the rate of charge of a battery may vary. It is generally preferred to fast-charge batteries until they develop about an 80-85% SOC and then to charge them much more slowly, trickle charge, until a full state of charge is achieved. Thus, depending on the battery SOC it may be preferred to direct only a portion of the solar cell power to the battery even if its SOC is less than 100%. A battery in this condition will be referred to as 'acceptably charged'.

Thus if the accessory and traction batteries are acceptably charged, solar power excess to the needs of charging batteries will be available. It is preferred to direct this 'excess' solar cell power to applications whose future use may reasonably be anticipated. Many of these applications relate to maintaining a comfortable vehicle cabin environment since most vehicle operators prefer a cabin temperature of between 18° C. and 24° C. And, if the outside air temperature is appreciably greater or less than these limits, most operators will, on entering the vehicle, seek to condition the cabin air. This will entail heating or cooling the cabin air, as appropriate, coupled with air circulation resulting, at least partially from operation of the HVAC fan. If these devices, heater, cooler and fan, may be operated to bring the cabin temperature closer to the operator's preferred range using available solar power, then future battery demands for cabin comfort may be reduced.

This approach is particularly directed to the situation where the vehicle cabin, due to solar heating, is appreciably warmer than ambient, since this implies that the solar array will be capable of significant output.

The temperature rise due to solar heating may be appreciable. As an example, in tests conducted on an SUV, parked in full sun, the interior temperature reached 45° C. with an ambient temperature of 30° C. That is, the cabin environment was 15° C. warmer than ambient. While the specifics may vary on a case-by-case basis, this behavior is generally observed. Typically 50% to 75% of the thermal energy entering the passenger compartment is from transmitted and absorbed solar energy at the glazings. Transmitted energy is primarily absorbed directly by the interior mass. The absorbed energy at the glazing is transferred to the interior by convection and re-radiation in the thermal IR wavelength range.

Various venting approaches may be employed to reduce the interior temperature. Passive approaches such as partially opening the windows or sunroof, if so equipped, may be employed, but these are generally not preferred due to their potential for admitting rain, insects, and other animals and their negative impact on vehicle security. Active approaches like operating the blower at only its medium setting, however, proved almost equally effective in reducing the cabin temperature and avoided the security and rain or insect admittance problems.

Of course, cabin temperatures need not approach the temperatures encountered in this example, but it will be appreciated that solar heating will always increase the cabin temperature above ambient so that solar cell-powered active ventilation will always be effective in lowering cabin temperature. This lowered cabin temperature may still be perceived as uncomfortable, however, and the operator may seek to further lower the cabin temperature.

Figure 5:
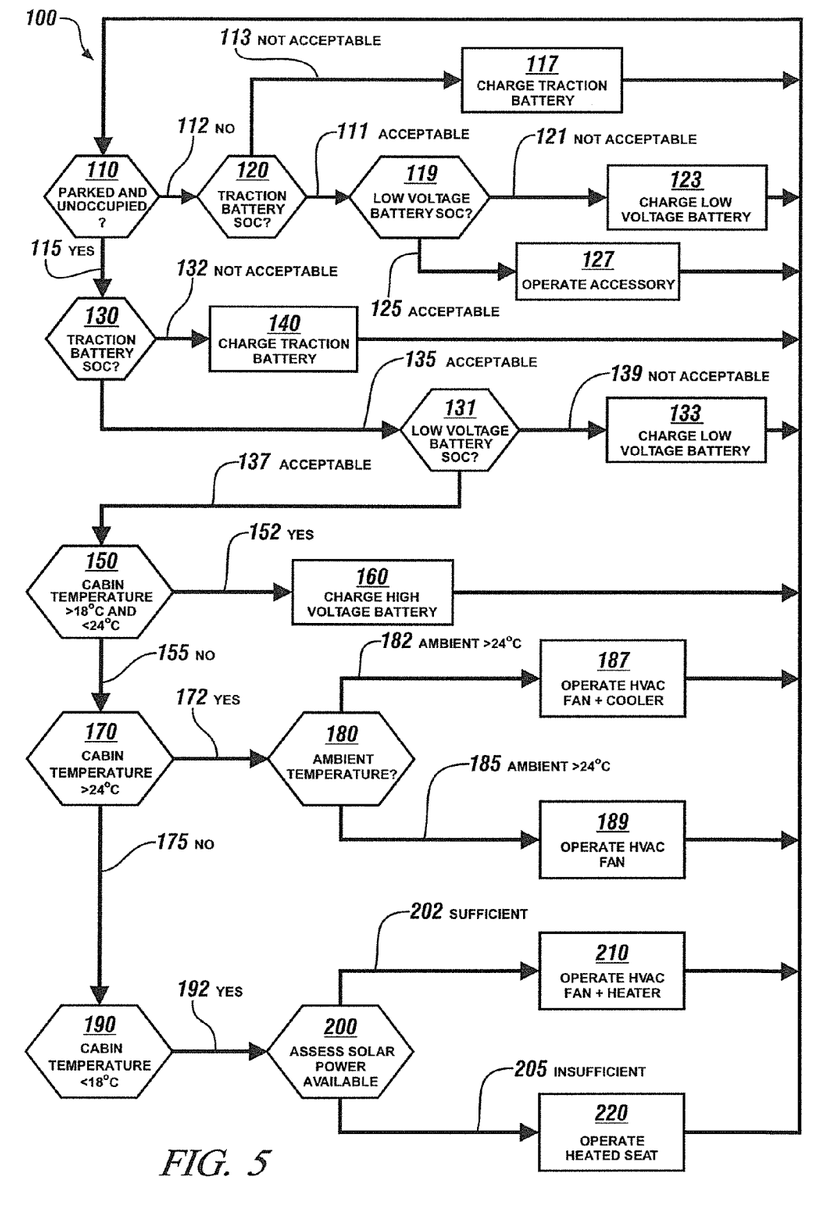
FIG. 5 shows an illustrative embodiment of a decision tree for directing solar cell array power to electrical loads in the vehicle depending on factors including: whether or not the vehicle is parked; the state of charge of the accessory battery; the state of charge of the traction battery; and the cabin temperature and the ambient temperature.

A decision tree 100 for use by the controller in directing the solar cell array power is shown as FIG. 5 and described below. Following the previous discussion it may be assumed that the power output of the solar cell is known to the controller. It should also be recognized that the controller will incorporate suitable control capabilities and electrical connections for accepting power from the solar cell and distributing that power in pre-determined proportion to any device. This power apportionment and the logic underlying it may be implemented by a set of algorithms incorporated in a computer, or computer-like device. It is preferred that the computer be integral with the controller but other approaches such as employing the vehicle ECU, or electronic control unit, to execute the computations may also be followed The first "Start" decision step 110, is to determine whether or not the vehicle is parked and unoccupied. This determination may be readily made by checking both the propulsion motor power switch, the switch applying high voltage battery power to the propulsion motor, and the vehicle occupant sensors currently incorporated in vehicles for controlling air bag deployment. Clearly the position of the propulsion motor power switch, 'Off' or 'On', will indicate whether or not the vehicle is operating and the occupant sensors will determine whether or not the vehicle is occupied.

If it is not parked and unoccupied, but in operation with the propulsion motor power switch 'On', outcome 112, then it will be assumed that demands are being placed on the low-voltage battery due to comfort and accessory usage. The case where the propulsion motor power switch is 'Off' but an occupant is detected will be treated in the same way. It will be assumed that the occupant may take advantage of the comfort, entertainment or other accessory features of the vehicle and place similar electrical demands on the low-voltage battery. It is further assumed, following the previous discussion, that the electrical demand may exceed the available solar power. This case triggers decision step 120, assessing the traction battery state of charge (SOC) and determining whether or not the assessed SOC is 'Acceptable', outcome 111 or 'Not Acceptable', outcome 113. If the 'Traction Battery SOC' at 120 is 'Not Acceptable' the action taken is to 'Charge the High-Voltage Traction Battery', step 117, and direct the solar-derived power to the traction battery either directly or through the use of DC-to-DC convertor. If the 'Traction Battery SOC' is 'Acceptable', then decision step 119, assessing the accessory battery SOC is initiated. If at step 119, 'Low-Voltage Battery SOC' is 'Not Acceptable', outcome 121, the action taken at step 123 is to 'Charge Low-Voltage Battery'. Alternatively should the low-voltage battery SOC be 'Acceptable', outcome 125, then the action taken should be to 'Operate an Accessory', step 127.

Returning to decision step 110, if the vehicle is parked and unoccupied, outcome 115, the first step, 130 is to assess the SOC of the traction battery. If, at 130, the 'Traction Battery SOC' is 'Not Acceptable', outcome 132, then action 140, 'Charge Traction Battery' should be executed.

If, at 130 the 'Traction Battery SOC' is 'Acceptable', outcome 135, then the next action is to assess the low-voltage battery SOC, step 131. If the 'Low-Voltage Battery SOC' is Not Acceptable', outcome 139 then the solar cell power should be directed to 'Charge Low-Voltage Battery' at step 133. If the low-voltage battery SOC is 'Acceptable', outcome 137, then knowledge of other factors will be employed to appropriately direct the power.

At step 150 it is determined whether the vehicle cabin temperature lies within the preferred range of about 18-24° C. If 'Vehicle Cabin Temperature >18° C. and <24° C.', outcome 152, then no action to control cabin temperature need be taken and the available solar power may be directed to charging the high-voltage traction battery, step 160.

If the cabin temperature is other than in the preferred 18° C.-24° C. or so temperature range, outcome 155, then if the cabin temperature is greater than 24° C., step 170, outcome 172, it is necessary to 'Determine (the) Ambient Temperature' at step 180. If the ambient temperature is greater than the desired cabin temperature of about 24° C., outcome 182, then the HVAC should be set to its "Vent" setting to draw in outside air, and the HVAC fan operated, step 187. If a cooler is available, particularly a thermoelectric cooler which intrinsically may be operated over a near-infinite range of power inputs, it may be advantageous to divide the solar cell array output between the fan and the cooler. In this case the fan will run more slowly than if the solar power was directed exclusively to the fan. However the solar cell array output power may be limited and even under ideal circumstances may not exceed 200 W so it may be necessary to identify a suitable apportionment of the available power between the fan and the cooler.

For example, if through experiment and/or modeling, it may be found more advantageous not to cool the incoming air but rather to circulate it more frequently, the cooler may not be used. This will enable all the available solar power to be directed to the fan so that the fan may be operated at a higher speed. Similarly it may be more beneficial to operate both fan and cooler in specific power allocation. The preferred combination of fan and cooler power allocations may also vary from vehicle to vehicle and be influenced by adoption of other technologies to reduce cabin temperature, such as reflective glazing, low solar-absorptive paint and others known to those skilled in the art.

If the cabin temperature is greater than about 24° C. but the ambient air temperature is less than about 24° C., outcome 185, then it may be assumed that the cabin temperature may be lowered to the preferred temperature range by circulation of outside air only. Thus operating the HVAC on "Vent" and operating the HVAC fan at its maximum speed, consistent with the available solar power, as shown in step 189, is preferred.

If the interior temperature is less than about 24° C., outcome 175, and also below about 18° C., step 190 then under outcome 192, the next step is to assess whether sufficient power is available to appreciably raise the cabin temperature, 'Assess Solar Power Available to Heat Cabin', decision step 200. If, based on experiment and/or modeling, sufficient power is available, outcome 202, then the preferred approach is to operate the HVAC fan on "Circulate" and operate a heater. The heater will be electrically-powered and may be thermoelectric or, more preferably, a resistance heater. Experimentation and/or modeling may be employed to most effectively apportion the available solar power between heater and fan, and this apportionment may vary with the ambient temperature.

As a non-limiting example, at decision step 200, it may be determined, on a cold cloudy day for example, that the available solar power is inadequate to significantly raise the cabin temperature, outcome 205. However there might be adequate power available to locally raise the temperature, for example by 'Operate Heated Seat', as at 220.

In recognition of the variability of the output from the solar cell array, solar power availability and load requirements will be made frequently, generally based on a predetermined sampling rate. Thus any of the actions taken will be undertaken for only a short time, before the algorithm will direct the controller to loop back to 'Start' decision 110 and repeat the process.

The frequency of such a loop should at least match, and preferably exceed the highest frequency with which either electrical demand changes or electric power generation changes to maintain these in balance. Solar radiation incident on the solar cell, even on a partly-cloudy day with fast-moving clouds is unlikely to vary more frequently than about once a minute. By contrast, particularly in heavy traffic, the occurrence or absence of regenerative braking may vary every few seconds. It therefore appears that assigning a predetermined loop frequency of between 2 and 10 seconds may be adequate to render a suitably-responsive system without incurring excessive computational overload.

The practice of the invention has been illustrated through reference to certain preferred embodiments that are intended to be exemplary and not limiting. The full scope of the invention is to be defined and limited only by the following claims.

The invention claimed is:

1. A method of extending the range of an at least electrically-powered vehicle when operating under electric power, the vehicle comprising at least a solar cell power source comprising a plurality of photovoltaic cells, a controller comprising a computer, a vehicle cabin temperature sensor, an ambient temperature sensor, a motion sensor, a high-voltage traction battery and a low-voltage battery, the low-voltage battery and the traction battery having a state-of-charge sensor, and a plurality of electric power-receiving devices;

the controller being connected to all of the sensors, the solar cell array power source and the electric power-receiving devices; the controller being capable of receiving and interpreting the outputs of the sensors; the controller being capable of distributing the power from the solar cell array to the electric power-receiving devices; the method comprising executing, in the controller, the steps of:

assessing the maximum available power from the solar cell array;

determining whether the vehicle is parked and unoccupied;

determining the high-voltage traction battery state of charge;

determining the low-voltage battery state of charge;

determining the cabin and ambient temperatures;

prioritizing the power-receiving devices according to their ability to promote increased vehicle range under the assessed maximum available power from the solar array;

distributing the power from the solar array to the highest priority power-receiving devices so that the power-receiving devices are operated under conditions where the electrical demand is substantially matched to the maximum power available from the array; and repeating the above steps at regular intervals.

2. The method of claim 1 wherein the vehicle is not parked and the state of charge of the high-voltage traction battery is not acceptable and the highest priority power-receiving device is the high-voltage traction battery.

3. The method of claim 1 wherein the vehicle is not parked and the state of charge of the high-voltage traction battery is acceptable and the state of charge of the low-voltage battery is not acceptable and the highest priority power-receiving device is the low-voltage battery.

4. The method of claim 1 wherein the vehicle is parked and the state of charge of the high-voltage traction battery is not acceptable and the highest priority power-receiving device is the high-voltage traction battery.

5. The method of claim 1 wherein the vehicle is parked and the state of charge of the high-voltage traction battery is acceptable and the state of charge of the low-voltage battery is unacceptable and the highest priority power-receiving device is the low-voltage battery.

6. The method of claim 1, further comprising comparing the cabin and ambient temperatures to a preferred temperature range.

7. The method of claim 6 wherein the preferred temperature range is from 18° C. to 24° C.

8. The method of claim 7, further comprising determining whether the cabin temperature is within the preferred temperature range.

9. The method of claim 8 wherein when the cabin temperature is within the preferred range, the available power is distributed to the high-voltage traction battery.

10. The method of claim 8 wherein when the cabin temperature is within the preferred range, the available power is distributed to the low voltage battery.

11. The method of claim 8 wherein when the cabin temperature is without the preferred range the available power is distributed to one or more power-receiving devices.

12. The method of claim 8 wherein the power-receiving device is one of the group consisting of an HVAC fan, an air conditioner, a heater and a seat heater.

13. The method of claim 1 wherein at least some of the photovoltaic cells in the solar cell power source are electrically-connected to deliver electrical power at a voltage of about 12 volts.

14. The method of claim 1 wherein at least some of the photovoltaic cells in the solar cell power source are electrically-connected to deliver electrical power at a voltage of about 300 volts.

15. The method of claim 1 wherein the solar cell power source contains at least one photovoltaic cell not electrically connected to any other photovoltaic cell, the photovoltaic cell being adapted for independent operation and suitable for assessing the output of the solar cell power source.

16. The method of claim 1 wherein the solar cell array contains at least one solar cell intended for independent operation for assessing the output of the solar cell array.

* * * * *